(12) United States Patent
Wang (10) Patent No.: US 9,632,406 B2
(45) Date of Patent: Apr. 25, 2017

(54) THREE-DIMENSION LIGHT FIELD CONSTRUCTION APPARATUS (71) Applicant: DELTA ELECTRONICS, INC., Taoyuan County (TW)

(72) Inventor: Yu-Chang Wang, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/878,002

(22) Filed: Oct. 8, 2015

(65) Prior Publication Data
US 2016/0246165 A1 Aug. 25, 2016

(30) Foreign Application Priority Data

Feb. 25, 2015 (TW) .............................. 104105981 A (51) Int. Cl.
*G03B 21/625* (2014.01)
*G03B 35/20* (2006.01)
*G02B 3/00* (2006.01)
*G02B 3/08* (2006.01)
*G03B 21/28* (2006.01)
(Continued)

(52) U.S. Cl.
CPC .............. *G03B 35/20* (2013.01); *G02B 3/005* (2013.01); *G02B 3/08* (2013.01); *G02B 5/045* (2013.01); *G02B 17/002* (2013.01); *G02B 27/2214* (2013.01); *G03B 21/28* (2013.01);
(Continued)

(58) Field of Classification Search
CPC ...... G03B 21/56; G03B 21/62; G03B 21/602;
G03B 21/65; G03B 21/625; G02B 27/225; G02B 27/2214; G02B 27/2228; H04N 13/0402; H04N 13/0404; H04N 13/0406; H04N 13/0459
See application file for complete search history.

(56) References Cited

U.S. PATENT DOCUMENTS 5,848,829 A * 12/1998 Terada .................. G03B 21/62
353/74
7,581,837 B2 * 9/2009 Whitehead ............ G03B 21/60
315/307
(Continued)

FOREIGN PATENT DOCUMENTS

TW 201426014 7/2014

OTHER PUBLICATIONS

Office Action dated Sep. 19, 2016 from corresponding application No. TW 104105981.

*Primary Examiner* — Sultan Chowdhury
(74) *Attorney, Agent, or Firm* — Hauptman Ham, LLP (57) ABSTRACT

A three-dimension light field construction apparatus is applied to constrict a light field on a viewing plane. The three-dimension light field construction includes a plurality of projectors and a rear-displaying unit. The projectors are arranged along a first axis, and each projector projects an imaging beam along a second axis perpendicular to the first axis. The rear-displaying unit comprises a linear Fresnel lens and a vertical diffuser, the linear Fresnel lens is close to the projectors. The rear-displaying unit makes each of the imaging beams converge on a virtual surface between the rear-displaying unit and the viewing plane for forming at least one intersection, so as to construct at least one light field on the viewing plane.

9 Claims, 11 Drawing Sheets (51) Int. Cl.
*G02B 17/00* (2006.01)
*G02B 27/22* (2006.01)
*G02B 5/04* (2006.01)
*G03B 21/602* (2014.01)
*H04N 13/04* (2006.01)

(52) U.S. Cl.
CPC ......... *G03B 21/602* (2013.01); *G03B 21/625* (2013.01); *H04N 13/0404* (2013.01); *H04N 13/0459* (2013.01)

(56) References Cited

U.S. PATENT DOCUMENTS

| | | |
|---|---|---|
| 8,179,424 B2 | 5/2012 | Moller |
| 2006/0126174 A1* | 6/2006 | Gibilini ................ G03B 21/625 359/460 |
| 2006/0170869 A1* | 8/2006 | Shestak .............. G02B 27/2214 352/57 |
| 2008/0030428 A1* | 2/2008 | Tomisawa .......... G02B 27/2214 345/6 |
| 2010/0091354 A1* | 4/2010 | Nam .................. G02B 27/2214 359/298 |
| 2014/0185015 A1 | 7/2014 | Chen et al. |

* cited by examiner

THREE-DIMENSION LIGHT FIELD CONSTRUCTION APPARATUS

RELATED APPLICATION

This application claims priority to Taiwan Application Serial Number 104105981 filed Feb. 25, 2015, which is herein incorporated by reference.

BACKGROUND

Technical Field

The present disclosure relates to a projecting device. More particularly, the present disclosure relates to a three-dimension light field construction apparatus.

Description of Related Art

When a two eyed viewer looks an object, each eye sees a slightly different view due to binocular parallax and motion parallax, and a three-dimension (3D) image is observed by view's brain fusing the different views together. Because the eyes of humans are located at different lateral positions on the head, and the axial distance between two eyes is about 6 to 6.5 centimeters, the differences are mainly in the relative horizontal position of objects in the two images. These positional differences are referred to as horizontal disparities or, more generally, binocular disparities. Motion parallax means the differences in the image of an object over time with observer movement.

The development of 3D light field construction is based on the principle of stereopsis, which using spectroscopic techniques to make eyes receive different images to form the stereoscopic 3D image. There are two categories of 3D light field construction, 3D with glasses (or headset) and autostereoscopy 3D display. The 3D with glasses or headset is a first system of displaying stereoscopic, and has a range of applications but is inconvenient to limit by the need to wear glasses or headset A conventional autostereoscopy 3D display uses multiple projectors to generate different light fields with different viewing angles, it has the advantage of glassless, but is bulk, difficult to set and calibrate.

Figure 1:
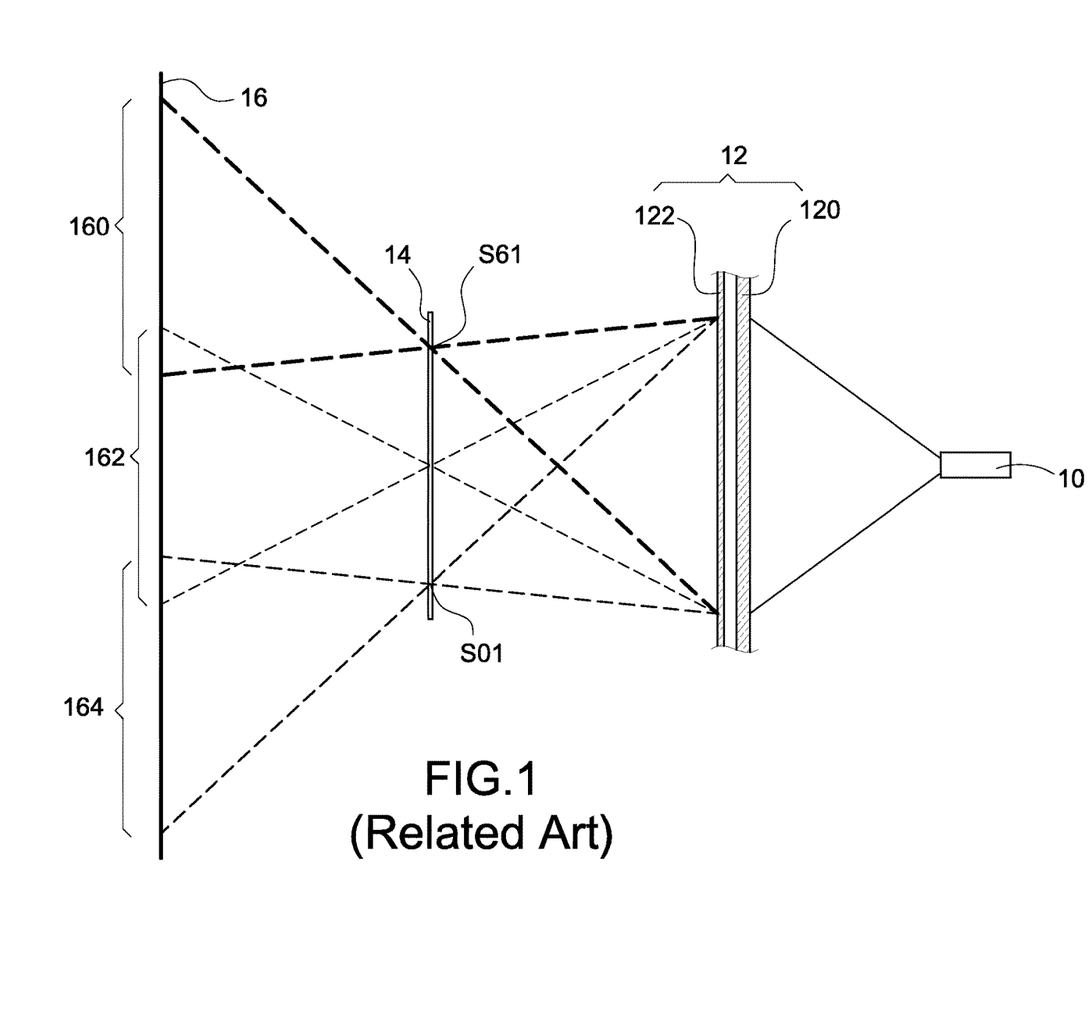
FIG. 1 is a schematic view of a conventional three-dimension light field construction apparatus.

Reference is made to FIG. 1, which is a schematic view of a conventional three-dimension light field construction apparatus. The three-dimension light field construction apparatus includes a projector 10, a rear-displaying unit 12, and a parallax barrier 14. The rear-displaying unit 12 is arranged between the projector 10 and the parallax barrier 14. The projector 10 projects an imaging beam, the imaging beams projected by the projector 10 are projected to a plurality of particular areas behind the parallax barrier 14 while switchable apertures of the parallax barrier 14 allow the imaging beams passing therethrough. In particular, the particular areas are viewing areas 160, 162, and 164 on a viewing plane 16.

The rear-display unit 12 includes an axial-symmetry Fresnel lens 120 and a diffuser 122. The Fresnel lens 120 is close to the projectors 10 and makes the imaging beams having divergence to be collimated beams. The diffuser 122 diffuses the collimated beams in all directions.

The parallax barrier 14 is, for example, liquid crystal barrier. The parallax barrier 14 receives light passing the rear-displaying unit 12, and constructs light fields by switching at least one switchable aperture to be opened and allows corresponding imaging beam passing therethrough. For example, when switchable aperture S01 is opened, a light field is constructed on the viewing area 164, and a full light field can be constructed by switching the parallax barrier 14 from switchable aperture S01 to S61 in serial.

In order to observe a 3D image, the width of the switchable aperture must be appropriately designed to ensure the left eye of a viewer only sees the left view and the right eye of the views only sees the right view. This ensure that each eye of the viewer sees the appropriate image allowing the viewer's brain create a 3D image.

However, the parallax barrier 14 only allows imaging beams passing through the opened switchable aperture, the fact which results in an inefficiency of light utilization and small-scale system, and shields off most of imaging beams projected by the projectors 10.

SUMMARY

According to one aspect of the present invention, a three-dimension light field construction apparatus is applied to constrict a light field on a viewing plane. The three-dimension light field construction apparatus includes a plurality of projectors and a rear-displaying unit. The projectors are arranged along a first axis, and each projector projects an imaging beam along a second axis perpendicular to the first axis. The rear-displaying unit comprises a linear Fresnel lens and a vertical diffuser, the linear Fresnel lens is close to the projectors. The rear-displaying unit makes each of the imaging beams converge on a virtual surface between the rear-displaying unit and the viewing plane for forming at least one intersection, so as to construct at least one light field on the viewing plane.

The three-dimension light field construction apparatus can further include a one-dimension optical-converging component. The one-dimension optical-converging component includes a plurality of sub-lenses arranged along the first axis and each of the sub-lenses can protrude forward the second axis. An amount of the sub-lenses is inversely proportional to an amount of the projectors, and each sub-lens makes the imaging beam projected by each projector construct a plurality of light fields on the viewing plane.

A focal length of the linear Fresnel lens is preferably smaller than a distance between the projectors and the rear-displaying unit.

The three-dimension light field construction apparatus can further comprise a light-splitting prism arranged between the linear Fresnel lens and the vertical diffusor, and configured to construct a plurality of identical light fields to increase field of view. The light-splitting prism can include a plurality of light-refracting structures, each light-refracting structure comprises a first surface, a second surface, and a third surface, and the second surface and the third surface are symmetrically adjacent to the first surface.

According to another aspect of the present invention, a three-dimension light field construction apparatus configured to construct at least one light field on a viewing plane. The three-dimension light field construction apparatus includes a plurality of projectors and a reflective-displaying unit. The projectors are arranged along a first axis, and each projector projects an imaging beam along a second axis perpendicular to the first axis. The reflective-displaying unit includes a plurality of concave mirrors and a plurality of pixel units. The concave mirrors are arranged in an arc direction to face the projectors, and the pixel units are placed on each of the concave minors. The concave mirrors make each of the imaging beams converge on a virtual surface between the reflective-displaying unit and the viewing plane for forming a plurality of intersections, so as to construct a plurality of light fields on the viewing plane.

The pixel units can comprise a first cambered surface, a second cambered surface, and a third cambered surface. The second cambered surface and the third cambered surface are adjacent to the first cambered surface respectively, and the first to third cambered surfaces face the projectors respectively.

BRIEF DESCRIPTION OF THE DRAWINGS

The present disclosure can be more fully understood by reading the following detailed description of the embodiment, with reference made to the accompanying drawings as follows.

DETAILED DESCRIPTION

A preferred embodiment of the present invention will be described with reference to the drawings.

Figure 2:
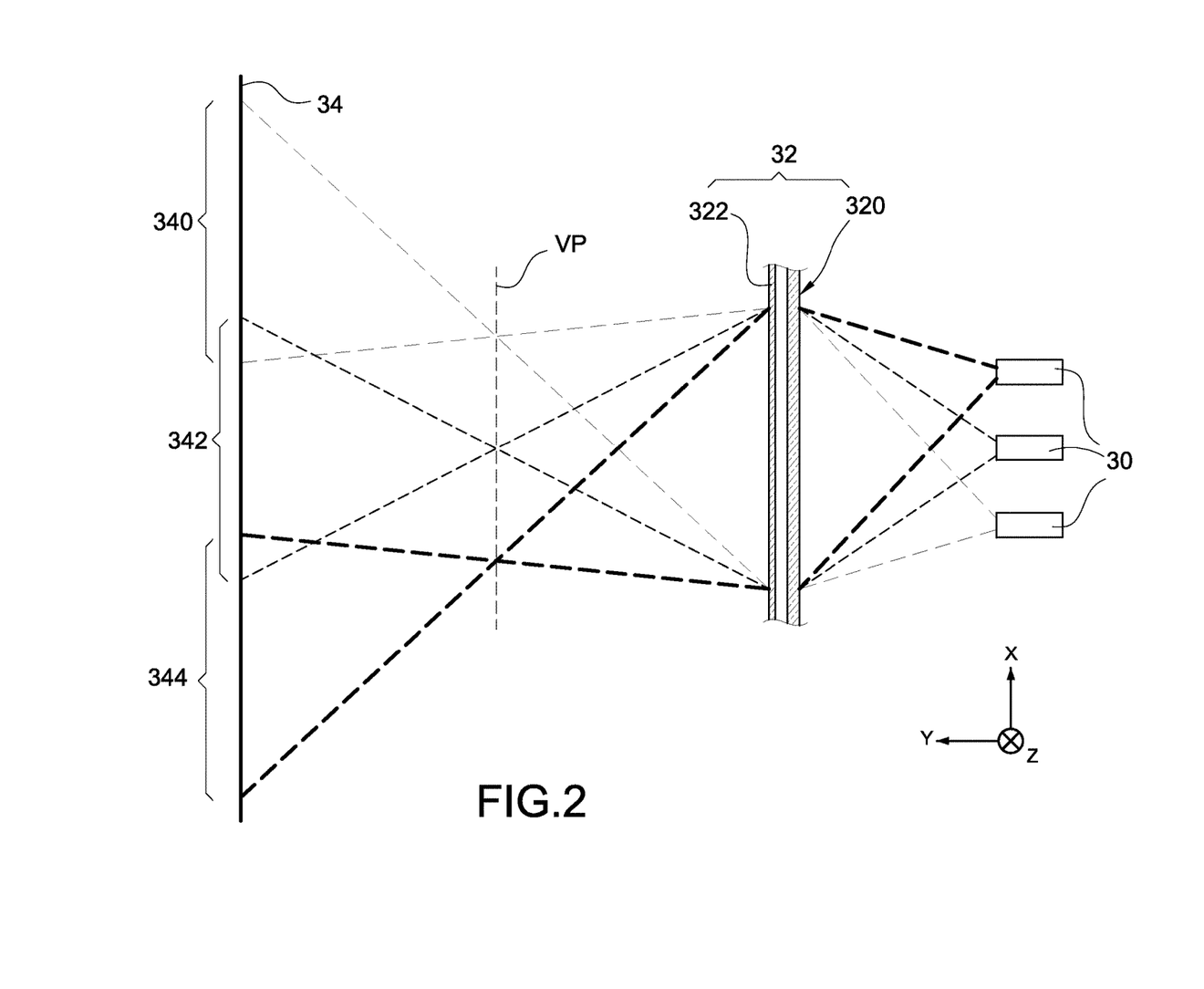
FIG. 2 is a schematic view of a three-dimension light field construction apparatus according to a first embodiment of the present invention.

Reference is made to FIG. 2, which is a schematic view of a three-dimension light field construction apparatus according to a first embodiment of the present invention. The three-dimension light field construction apparatus includes a plurality of projectors 30 and a rear-displaying unit 32. The projectors 30 are arranged along a first axis X, and each projector projects an imaging beam along a second axis Y perpendicular to the first axis X. In FIG. 2, the three-dimension light field construction apparatus has three projectors 30 to represent multiple projectors. The imaging beams projected by the projectors 30 construct a plurality of light fields on particular areas behind the rear-displaying unit 32, and the particular positions are viewing areas 340, 342 and 344 on an viewing plane 34 where viewers can view.

The rear-display unit 32 includes a linear Fresnel lens 320 and a vertical diffuser 322, and the linear Fresnel lens 320 is close to the projectors 30. The linear Fresnel lens 320 receives the imaging beams projected by the projectors 30, and makes the imaging beams to be collimated beams. The vertical diffuser 322 diffuses the collimated beams along a third axis Z instead of the first axis X.

The linear Fresnel lens 320 and the vertical diffuser 322 are matched to collect and converge each of the imaging beams projected by one of the projector 30 to form an intersection on a virtual surface VP between the rear-displaying unit 32 and the viewing plane 34, and transmit the imaging beam to the viewing plane 34 to construct at least one light field on the viewing plane 34. The virtual surface VP is parallel to the first axis X (or perpendicular to the second axis Y), and each of the imaging beams divergently transmits from the virtual surface VP to the viewing surface 34. Each projector 30 can construct a light field on the viewing plane 34, and each light field constructed by the responding projector and rear-displaying unit is the same as the light field constructed by projector and parallax barrier aforementioned in related art.

In other words, the imaging beams passing through the linear Fresnel lens 320 and the vertical diffuser 322 can achieve the effect of parallax barrier as aforementioned in the related art and then construct the light fields. The virtual apertures arranged on the virtual plane VP between the rear-displaying unit 32 and the viewing plane 34 are to reemit light beams therefrom.

The three-dimension light field construction apparatus of the present invention does not have rear parallax barrier, and the inefficiency caused by imaging beams shielded by the rear parallax barrier is thereby prevented. This is to say the three-dimension light field construction apparatus of this embodiment has advantages of high light utility efficiency and the brightness thereof can be increased while the amount of the projector is increased.

Figure 3:
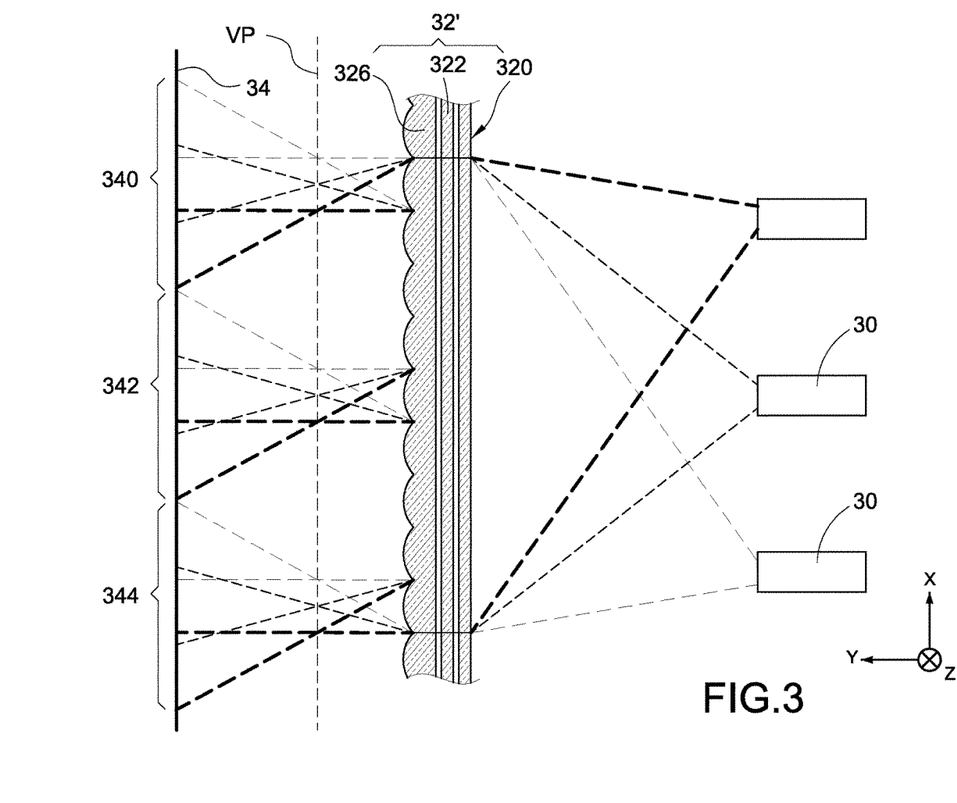
FIG. 3 is a schematic view of a three-dimension light field construction apparatus according to a second embodiment of the present invention.

Reference is made to FIG. 3, which is a schematic view of a three-dimension light field construction apparatus according to a second embodiment of the present invention. The three-dimension light field construction apparatus includes a plurality of projectors 30 and a rear-displaying unit 32'. The rear-display unit 32' includes a linear Fresnel lens 320, a vertical diffuser 322, and a one-dimension optical-convergent component 326. The projectors 30 are arranged along in a first axis X, and each projector 30 projects an imaging beam to a second axis Y. The imaging beams projected by the projectors 30 construct a plurality of light fields on particular areas behind the rear-displaying unit 32, and the particular areas are viewing areas 340, 342 and 344 on an viewing plane 34 where viewers can see.

Figure 4:
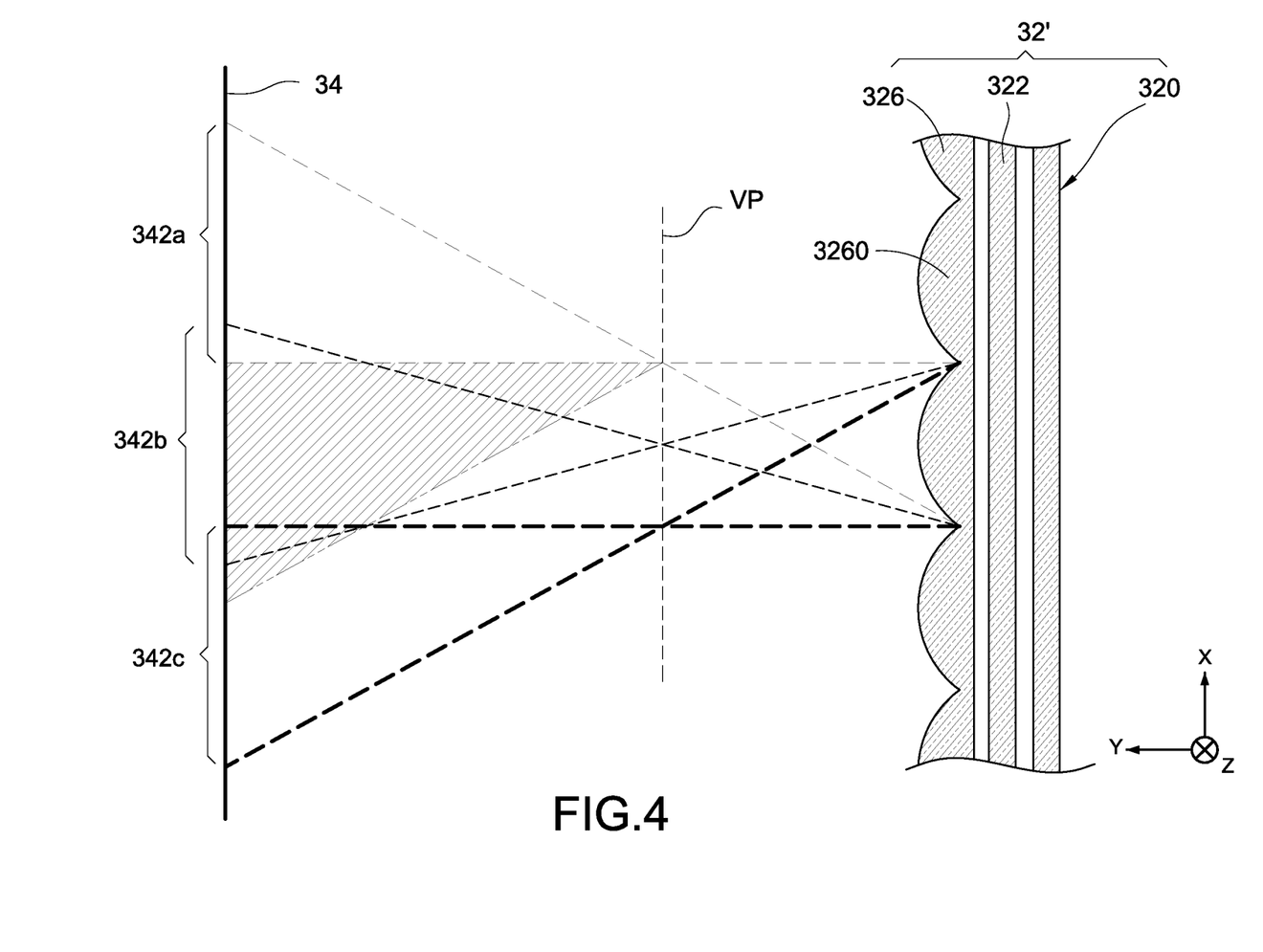
FIG. 4 is a partially enlarge view of a displaying unit shown in FIG. 3.

Reference is made to FIG. 4, which shows the light field constructed on the viewing area 342, wherein the FIG. 4 is a side view of the cross sectional view of the rear-display unit 32' and the viewing area. The one-dimension optical-convergent component 326 includes a plurality of sub-lenses 3260 arranged along the first axis X and protrude toward the second axis Y. In particular, the amount of the sub-lenses 3260 is inversely proportional to the amount of the projectors 30. It should be noted that the sub-lenses 3260 can be arranged along the first axis X and protrude opposite to the second axis Y.

The imaging beam projected by each projector 30 and passed the linear Fresnel lens 320 is optically adjusted to be parallel imaging beam because the focal length of the linear Fresnel lens 320 is designed to be larger than or equal to the distance between the projectors 30 and the rear-displaying unit 32'. The parallel imaging beam is then optically adjusted to be convergent and form a plurality of intersections on the virtual plane VP by the corresponding sub-lens 3260, and construct sub-light fields respectively on the viewing areas 342a, 342b, and 342c, as shown in FIG. 3. It should be noted that the sub-light fields on the viewing areas 342a, 342b, and 342c shown on the FIG. 4 are constructed only by single projector 30 shown on the FIG. 3 because the one-dimension optical-convergent component 326 optically adjusts signal parallel imaging beam to generate a plurality of intersections on the virtual plane VP and constructs light field similar to that constructed by real parallax barrier.

Therefore, the number of the projectors 30 in this embodiment is less than that of in the first embodiment and the three-dimension light field construction apparatus in this embodiment can construct light field for creating 3D images as the three-dimension light field construction apparatus in the first embodiment due to each of the sub-lenses 3260 constructs a plurality of sub-light fields.

Figure 5:
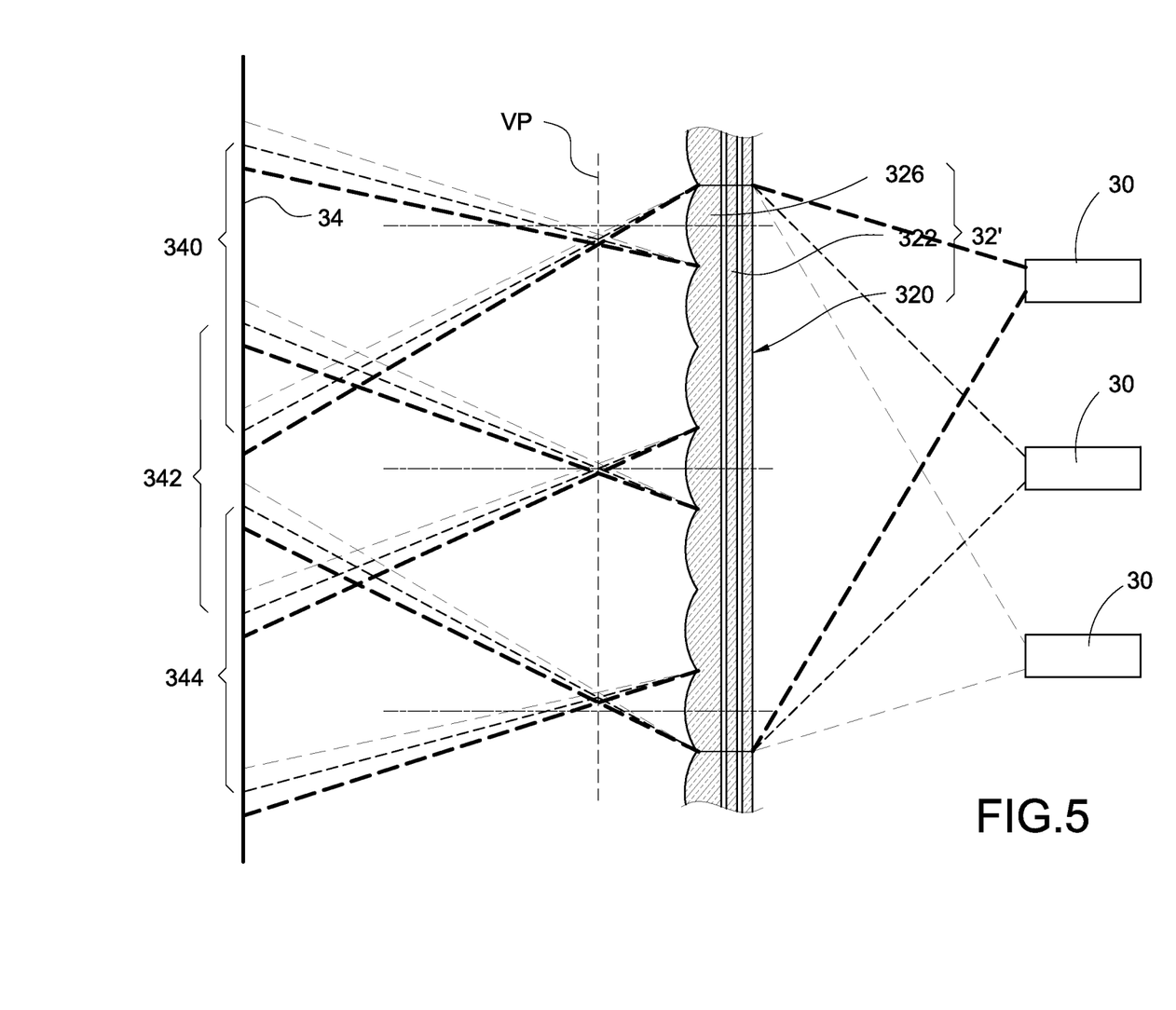
FIG. 5 is a schematic view of a three-dimension light field construction apparatus according to a third embodiment of the present invention.
Figure 6:
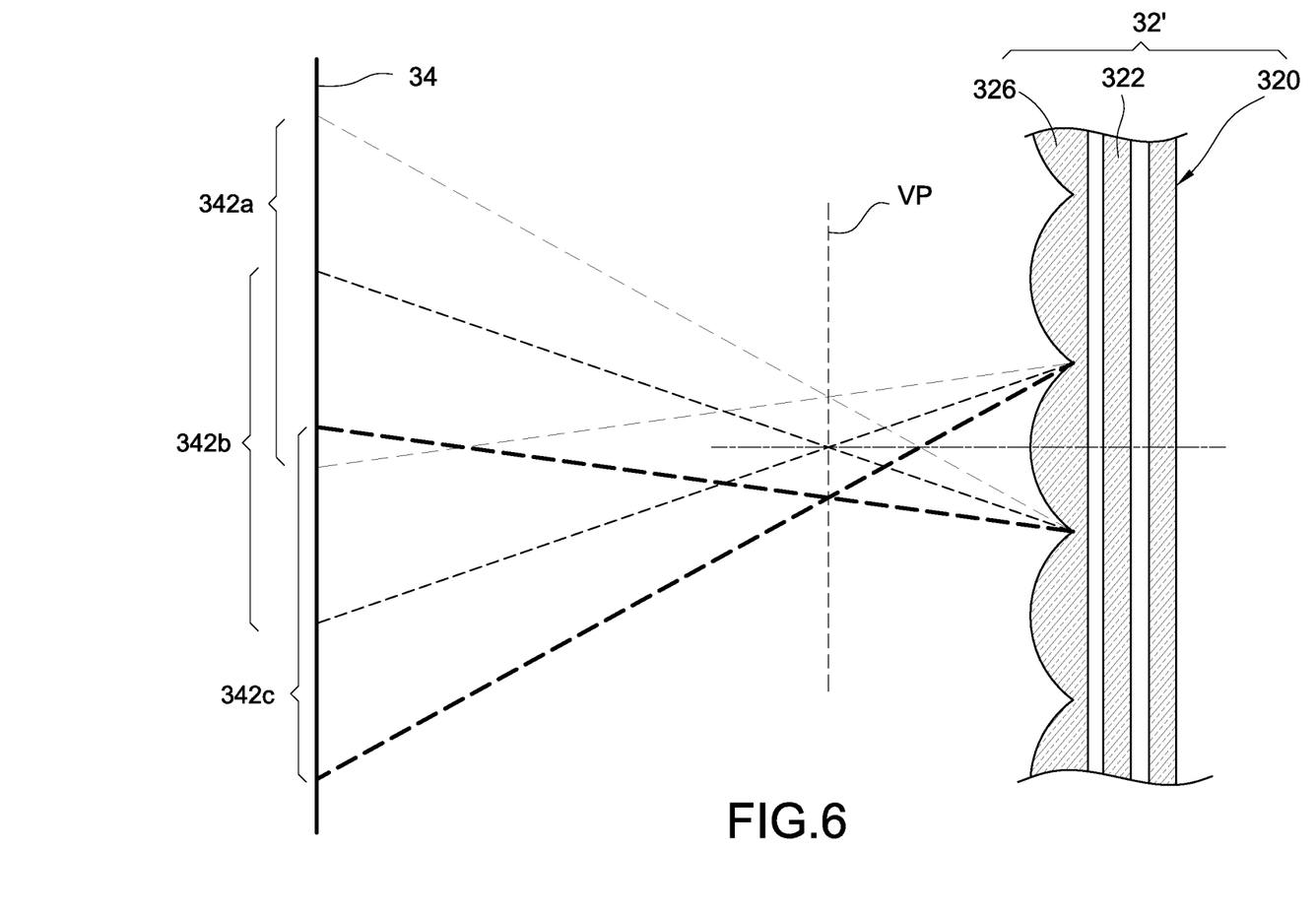
FIG. 6 is a partially enlarge view of a displaying unit shown in FIG. 5.

As can be seen in FIG. 4, one of the sub lens 3260 makes the intersections forms on the virtual plane VP and construct sub-light fields respectively on the viewing areas 342a, 342b, and 342c. The three intersections shown in the FIG. 4 are corresponding to the projectors 30 shown on the FIG. 3 which have different angles relative to the sub-lens 3260. Since the linear Fresnel lens 320 is designed to be larger than or equal to the distance between the projectors 30 and the rear-displaying unit 32', the three-dimension light field construction apparatus incapable of constructing a full light field at some locations, wherein the sub-light field constructed on the viewing area 342b shown in the FIG. 4 may be a full light field, but the sub-light fields constructed on the viewing areas 342a and 342c shown in the FIG. 4 are not full light fields. In particular, the imaging beam projected by the lower projector 30 shown in the FIG. 3 is inclined upward while passing the sub-lens 3260, and the sub-light field constructed on the viewing area 342a is just distributed on an upper segment of a line connecting to the intersection made by the lower projector 30 and the sub-lens 3260. However, the full light field is a light field which distributed not only the upper segment but also the lower segment (as the shield segment shown in FIG. 4) of the line connecting to the intersection and the sub-lens 3260. In order to overcome the aforementioned problem, the focal length of the linear Fresnel lens 320 must be designed to be smaller than the distance between the projectors 30 and the rear-displaying unit 32' to allow the parallel imaging beams optically adjusted by the linear Fresnel lens 320 become convergent beam. Thus a full light field can be constructed on the viewing plane 34, as shown in FIG. 5 and FIG. 6, wherein FIG. 5 is a schematic view of the three-dimension light field construction apparatus according to a third embodiment of the present invention, and FIG. 6 shows a partially enlarge view of a displaying unit shown in FIG. 5. As can be seen in FIG. 6, the sub-light field constructed on the viewing area 342a is not only distributed at the upper segment of the line connecting the intersection and the sub-lens, but also distributed at the lower segment of the line connecting the intersection and the sub-lens. It should be noted that the light field constructed on the viewing area 340 shown in the FIG. 5 is slightly inclined downward and the light field constructed on the viewing area 344 shown in the FIG. 5 is slightly inclined.

Figure 7:
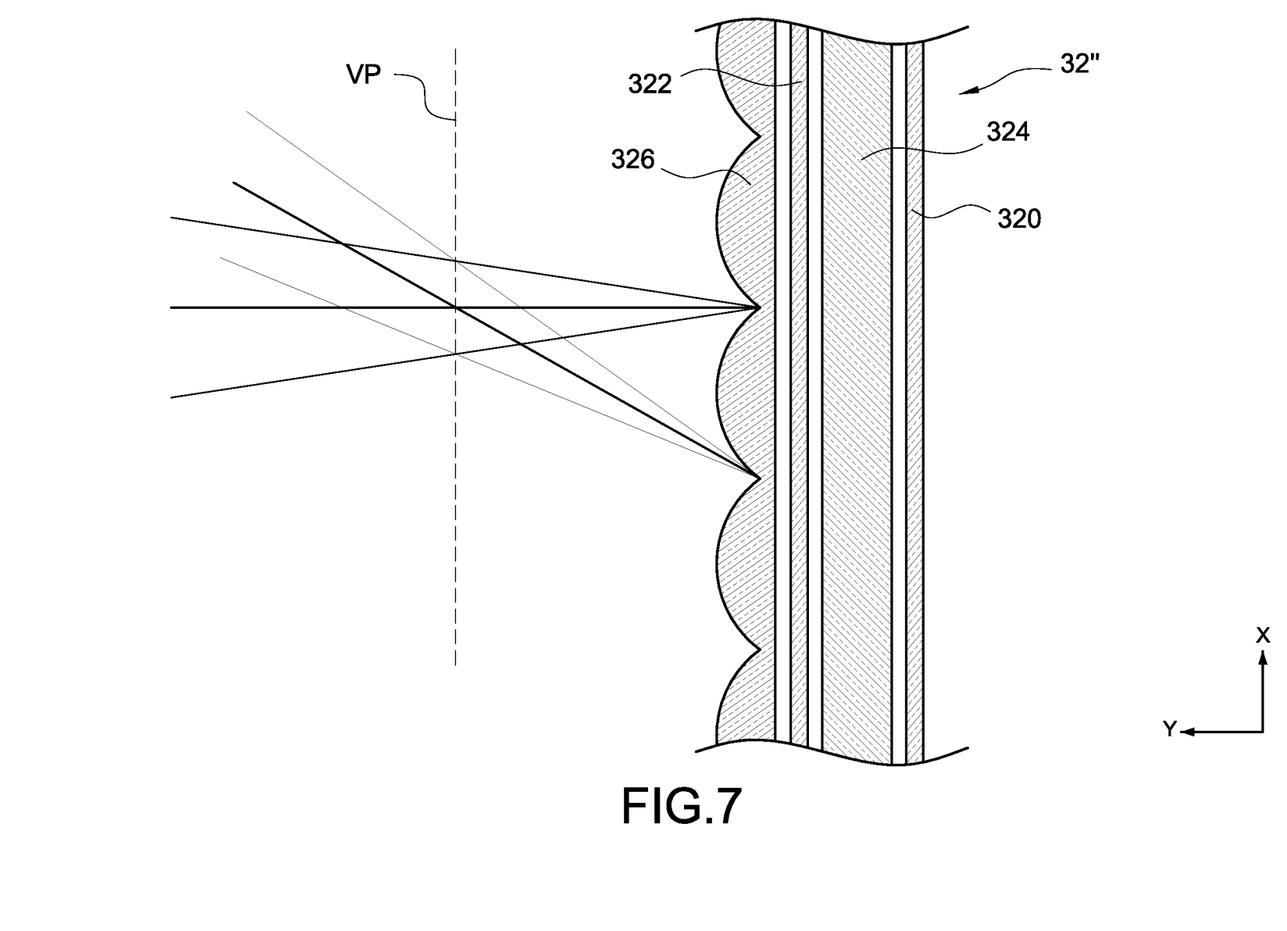
FIG. 7 is an enlarge view of a three-dimension light field construction apparatus according to a fourth embodiment of the present invention.

Reference is made to FIG. 7, which is a schematic view of a three-dimension light field construction apparatus according to a fourth embodiment of the present invention. The three-dimension light field construction apparatus shown in FIG. 7 is similar to the three-dimension light field construction apparatus mentioned in the first embodiment, and the same reference numbers are used in the drawing and the description to refer to the same parts. It should be noted that the rear-displaying unit 32" shown in FIG. 7 further includes a light-splitting prism 324.

Figure 8:
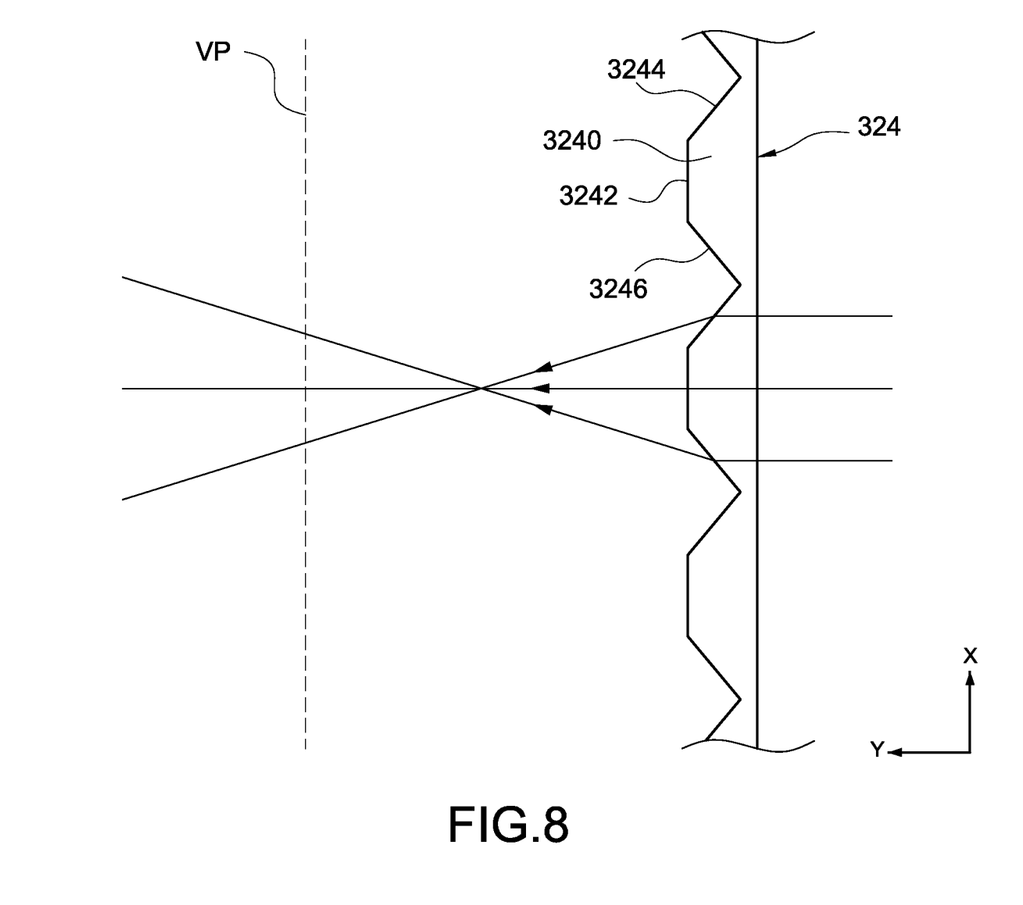
FIG. 8 is an enlarge view of the light-splitting prism.

The light-splitting prism 324 is arranged between the linear Fresnel lens 320 and the vertical diffuser 322 and includes a plurality of light-refracting structures 3240, as shown in FIG. 8. Each of the light-refracting structure 3240 includes a first surface 3242, a second surface 3244, and a third surface 3246, the first surface 3242, the second surface 3244, and the third surface 3246 are flat surfaces, and the second surface 3244 and the third surface 3246 are symmetrically adjacent to two sides of the first surface 3242. The light-splitting prism 324 splits single imaging beam transmitting therein into three light beams by the first surface 3242, the second surface 3244, and the third surface 3246, therefore a plurality of identical light fields are constructed and field of view of the three-dimension light field construction apparatus is increased. In the practical applications, the first surface 3242, the second surface 3244, and the third surface 3246 of the light-refracting structure 3240 can be cambered surfaces.

Figure 9:
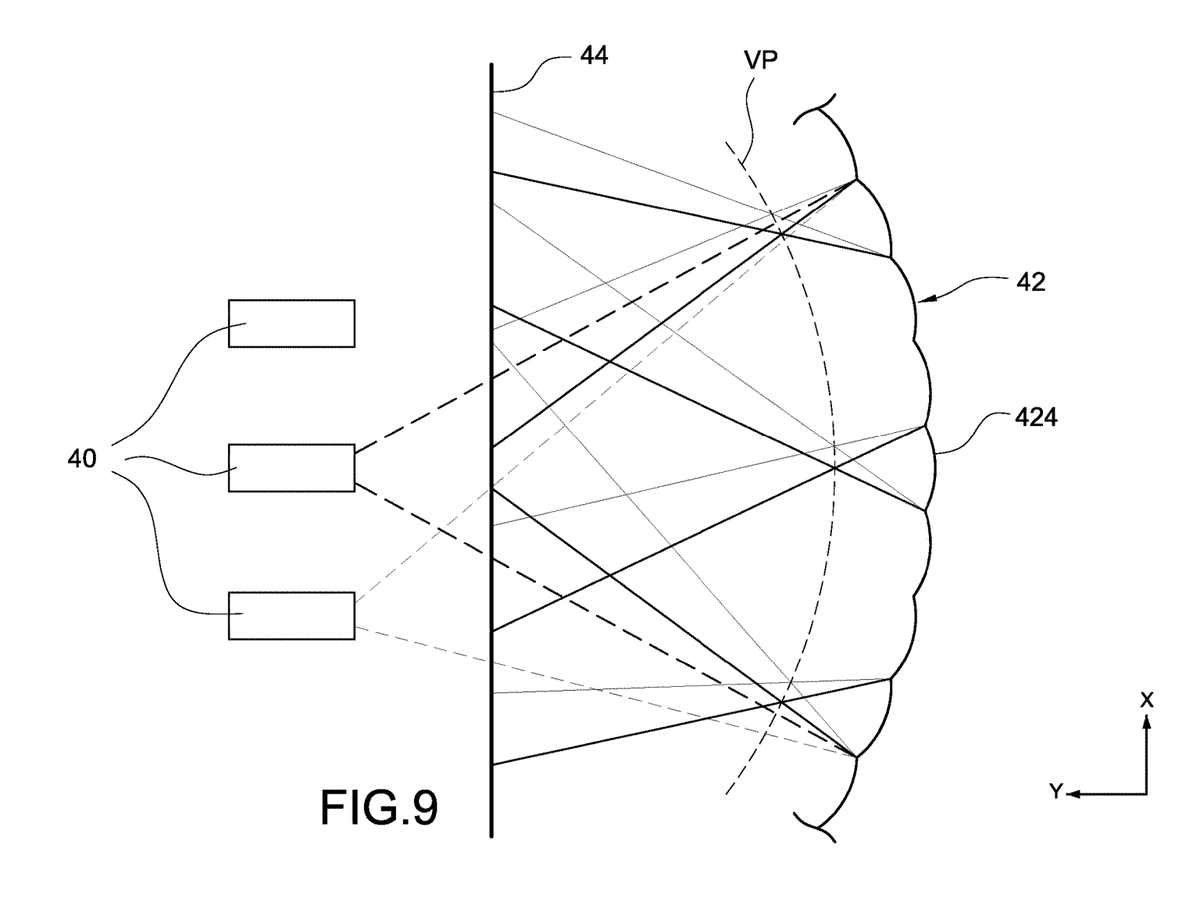
FIG. 9 is a schematic view of a three-dimension light field construction apparatus according to a fifth embodiment of the present invention.
Figure 10:
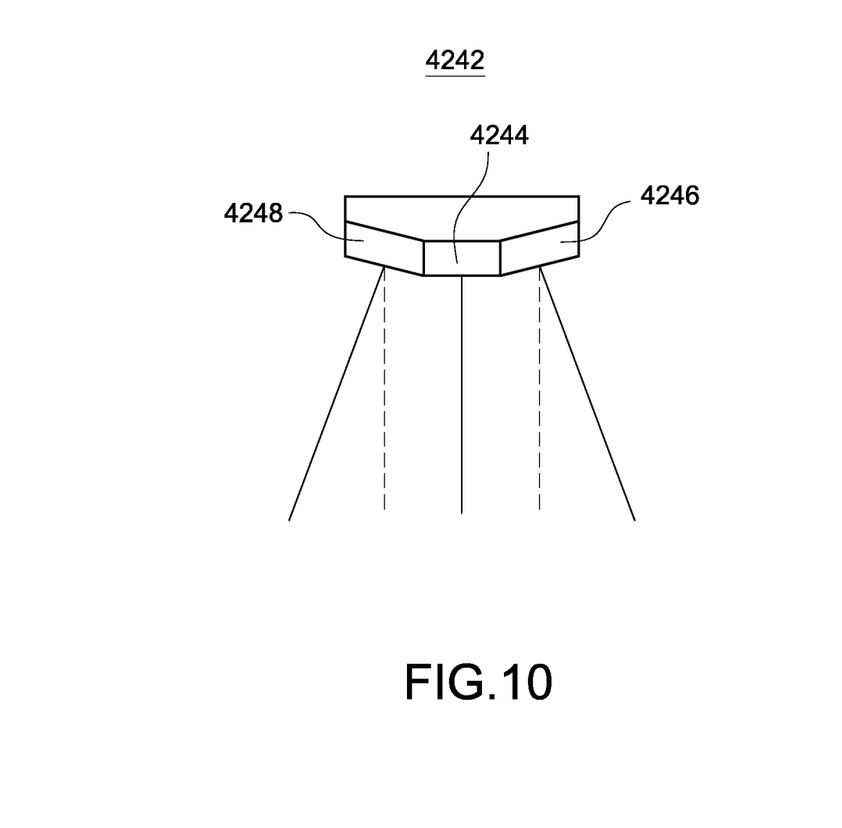
FIG. 10 a top view of each pixel unit.
Figure 11:
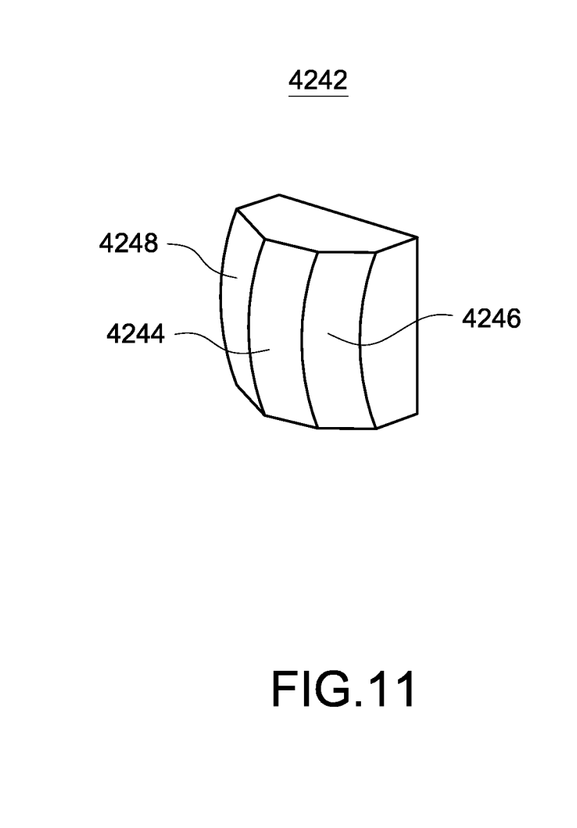
FIG. 11 a perspective view of pixel unit.

Reference is made to FIG. 9, which is a schematic view of a three-dimension light field construction apparatus according to a fifth embodiment of the present invention. The three-dimension light field construction apparatus includes a plurality of projector 40 and a reflective-displaying unit 42. The projectors 40 are arranged along a first axis X, and each projector 30 projects an imaging beam to a second axis Y perpendicular to the first axis X. The imaging beam is then transmitted to a viewing plane 44 located between the projectors 40 and the reflective-displaying unit 42 by reflection. The reflective-displaying unit 42 includes a plurality of concave minors 424 and a plurality of pixel units 4242 (as shown in FIG. 10 and FIG. 11). The concaved mirrors 424 face the projector 40, the pixel units 4242 are placed on each concaved mirror 424 in a cambered manner, and the concaved mirrors 424 are arranged in an arc direction. Reference is made to FIG. 10 and FIG. 11, each pixel unit 4242 includes a first cambered surface 4244, a second cambered surface 4246, and a third cambered surface 4248, the second cambered surface 4246 and the third cambered surface 4248 are adjacent to the first cambered surface 4244 respectively. The first cambered surface 4244, the second cambered surface 4246, and the third cambered surface 4248 are configured to reflect the imaging beams projected thereto and construct a plurality of identical light fields.

Figure 12:
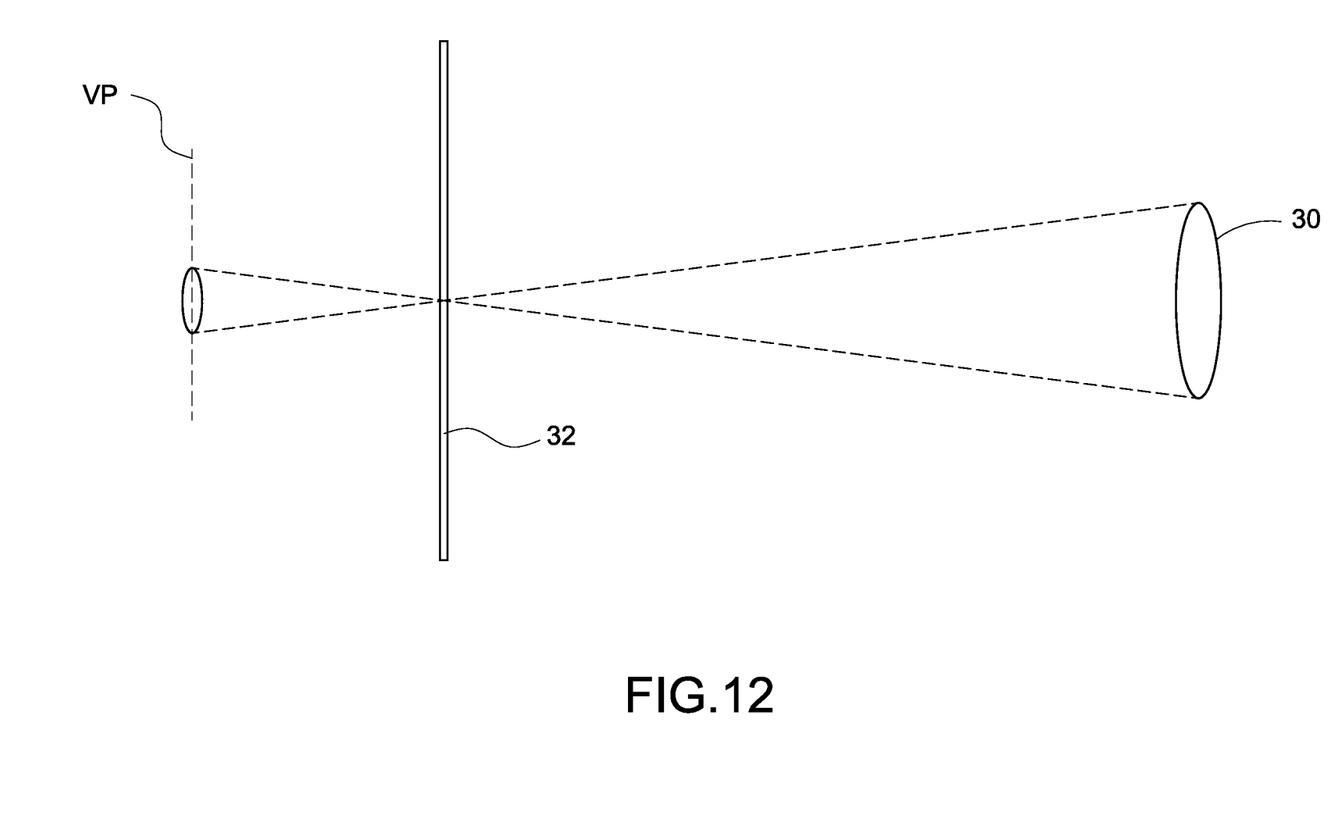
FIG. 12 shows that the scale of the virtual aperture on the virtual plane is proportional to the scale of the exit pupil of the projector.

It should be note that the scale of the virtual aperture on the virtual plane VP is proportional to the scale of the exit pupil of the projector 30, as shown in FIG. 12. Thus a discontinued light field is constructed on the viewing plane while the exit pupil of the projectors 30 is too small or the vertical aperture is too close to the rear-displaying unit 32. In order to overcome the problem, the light-splitting prism 324 aforementioned in the fourth embodiment and the pixel units 4242 placed the concaved minor 424 may be designed to be concave or convex from plane. Therefore, the width of each virtual aperture is regard as enlarged and then a continued light field is constructed.

The foregoing description, for purpose of explanation, has been described with reference to specific embodiments. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A three-dimension light field construction apparatus configured to construct at least one light field on a viewing plane, the three-dimension light field construction apparatus comprising:
   a plurality of projectors arranged along a first axis, and each of the projectors projecting an imaging beam along a second axis perpendicular to the first axis;
   a rear-displaying unit comprising a linear Fresnel lens and a vertical diffuser, the linear Fresnel lens close to the projectors, wherein the rear-displaying unit makes each of the imaging beams converge on a virtual surface between the rear-displaying unit and the viewing plane for forming at least one intersection, so as to construct at least one light field on the viewing plane; and
   a light-splitting prism arranged between the linear Fresnel lens and the vertical diffusor and configured to construct a plurality of identical light fields.

2. The three-dimension light field construction apparatus in claim 1, further comprising a one-dimension optical-converging component, the one-dimension optical-converging component comprising a plurality of sub-lenses arranged along the first axis, wherein an amount of the sub-lenses is inversely proportional to an amount of the projector, and each sub-lens makes the imaging beam projected by each projector construct a plurality of sub-light fields on the viewing plane.

3. The three-dimension light field construction apparatus in claim 2, wherein the sub-lenses protrude forward the second axis.

4. The three-dimension light field construction apparatus in claim 2, wherein a focal length of the linear Fresnel lens is smaller than a distance between the projectors and the rear-displaying unit.

5. The three-dimension light field construction apparatus in claim 1, wherein the light-splitting prism comprises a plurality of light-refracting structures, each light-refracting structure comprises a first surface, a second surface, and a third surface, and the second surface and the third surface are symmetrically adjacent to the first surface.

6. The three-dimension light field construction apparatus in claim 5, wherein the first surface, the second surface, and the third surface are flat surfaces.

7. The three-dimension light field construction apparatus in claim 1, the first surface, the second surface, and the third surface are curved surfaces.

8. A three-dimension light field construction apparatus configured to construct at least one light field on a viewing plane, the three-dimension light field construction apparatus comprising:
   a plurality of projectors arranged along a first axis, and each projector projecting an imaging beam along a second axis perpendicular to the first axis; and
   a reflective-displaying unit comprising:
      a plurality of concave mirrors arranged in an arc direction to face the projectors; and
      a plurality of pixel units placed on each of the concave mirrors;
   wherein the concave mirrors make each of the imaging beams converge on a virtual surface between the reflective-displaying unit and the viewing plane for forming a plurality of intersections, so as to construct a plurality of light fields on the viewing plane.

9. The three-dimension light field construction apparatus in claim 8, wherein each of the pixel units comprises a first cambered surface, a second cambered surface, and a third cambered surface, the second cambered surface and the third cambered surface are adjacent to the first cambered surface respectively, and the first, second and third cambered surfaces face the projectors respectively.

* * * * *